UNITED STATES PATENT OFFICE.

JOSÉ BAXERES ALZUGARAY, OF PORTO, PORTUGAL.

METALLURGICAL PROCESS.

SPECIFICATION forming part of Letters Patent No. 472,422, dated April 5, 1892.

Application filed June 20, 1890. Serial No. 356,133. (No specimens.) Patented in Spain March 4, 1889, No. 9,293; in Portugal September 3, 1889, No. 1,397; in France October 24, 1889, No. 201,521, and in Belgium February 8, 1890, No. 89,455.

*To all whom it may concern:*

Be it known that I, JOSÉ BAXERES ALZUGARAY, a citizen of the Argentine Republic, and a resident of Porto, Portugal, have invented a certain Metallurgical Process, (for which I have obtained a Spanish patent, No. 9,293, dated March 4, 1889; a Portuguese patent, No. 1,397, dated September 3, 1889; a French patent, No. 201,521, dated October 24, 1889, and a Belgian patent, No. 89,455, dated February 8, 1890,) of which the following is a specification.

This invention relates to a metallurgical process by which only one metal is extracted at a time from the ore under treatment, so that no subsequent separation by remelting and refining are necessary.

This process is essentially a reducing process and totally different from the metallurgical systems hitherto employed, which are based upon the principle of the formation of trisilicates in order to obtain at the highest degree of heat the melting of all the metals contained in the ores. The ores referred to are arsenic, antimony, bismuth, silver, chromium, cobalt, nickel, copper, tin, iron, manganese, molybdenum, gold, platinum, lead, titanium, uranium, and tungsten ores. These latter systems require, of course, the subsequent separation by more or less efficient and costly remelting and refining processes of the combined metals extracted simultaneously from complex ores, whereas by my new general metallurgical process the degree of heat actually employed in the furnace is strictly regulated by the melting-point of the one metal intended to be extracted from the ore under treatment, so that only the reduction of this principal metal is obtained, leaving all other metals which may be contained in the same ore in the state of oxides until the melting and simultaneous refining of the former is completed by the one operation, thus permitting the extraction by successive operations of all the different metals contained in the same ore separately and in a perfectly-pure condition by simply raising in the subsequent operations the degree of heat to the melting-point of such metal or metals which may have been left in the ore.

This new metallurgical process of reduction, through its cheapness and the great economy of fuel and working expenses realized by it, permits the advantageous working of all mineralized metals even of the poorest and most complex ores, their smelting being accomplished without any previous expensive process of concentration or calcination.

The ore as obtained from the mine is simply triturated and mixed with the salts and alkalies, absorbing the volatile and mineralizing elements of the metals in the proportions hereinafter indicated, and subsequently these mixtures of ore and reducing agents are poured into the crucible of the furnace, subjected to the required degree of heat corresponding to the melting-point of the metal intended to be obtained, being thus in one single operation reduced, melted, and refined.

Theoretically I give the following formulas of demineralizing fluxes or reducing agents to be added to each of the following most known ores:

I. *Iron ore.*—For each one hundred parts of iron ore add oxide of lime, (quicklime,) twenty parts; mineral or vegetable carbon, ten parts; silicious slag, (mono or hemi silicate,) sixty-three parts; fluor-spar, twenty parts; temperature of furnace, 2,150° centigrade.

II. *Pyrites of iron containing copper.*—For each one hundred parts of bisulphide of iron and copper add silicate of alumina, sixty parts; oxide of lime, (quicklime,) twenty-five parts; mineral or vegetable coal, according to the standard of copper, fluor-spar, common salt, small portions as may be required; temperature of furnace, 1,150° centigrade.

III. *Lead ore.*—For each one hundred parts of sulphide or carbon of lead add oxide of lime, (quicklime,) twenty parts; mineral or vegetable coal, ten parts; silicious slag, (mono or hemi silicate,) sixty parts; fluor-spar, fifteen parts; temperature of furnace, 850° centigrade.

IV. *Antimony ore.*—For each one hundred parts of antimony ore (sulph.) add oxide of iron, twenty parts; sulphate of soda, twenty parts; coal or anthracite, ten parts; quicklime, ten parts; temperature of furnace, 800° centigrade.

V. *Copper ore.*—For each one hundred parts of copper ore (oxides, carbonates, or sulphides) add oxide of soda, (caustic soda,) twenty parts; black ash, ten parts; temperature of furnace, 1,100° centigrade.

VI. *Tin ore.*—For each one hundred parts of tin ore (oxides or sulphides) add mineral or vegetable carbon, twenty parts; black ash, fifty parts; oxide of lime, (quicklime,) five parts; temperature of furnace, 800° centigrade.

VII. *Gold or silver ore.*—For each one hundred parts of gold or silver ores (all sorts of gangues) add sulphate of lead, (lead ore,) twenty parts; oxide of soda, (caustic soda,) seven parts; carbonate of soda, three parts; fluor-spar, twenty parts; temperature of furnace, 700° centigrade.

Although in the above examples, in speaking of certain ores, I only mention a single metal—for example, iron ore—such ores often contain many metals, the same flux being applicable to all. For instance, "iron ores," known as such, often contain besides the oxides of iron large quantities of chromium, titanium, tungsten, and sometimes gold, silver, copper, and lead.

Some of the above-mentioned ingredients are reductive agents, and more especially the more expensive among them may be regenerated, and thus employed for any length of time in successive operations.

The above-mentioned proportions of reducing agents (fluxes) may be modified or altered according to special requirements and to the metallic standard of the ore to be treated.

In addition to and independently of the above-indicated fluxes any such other alkaline agents, &c., can be employed as may be required for the purpose of this metallurgical dry process, based upon the peculiar properties of the alkalies and salts of alkaline and alkaline earthy metals of combining with the volatile elements and with the metalloids which have mineralized the metals, forming definite salts, leaving the metal in a free state—*i. e.*, demineralized—and consequently capable of being totally obtained by fusion, reduced, and refined in a single operation.

The composition of the slag employed is expressed by the formulas $ROSiO_2$ and $2ROSiO_2$.

The manner in which the flux absorbs or acts upon the volatile and mineralizing elements of the metals may be described as follows: Take, for example, formula I, where the iron ore is mixed with quicklime, carbon, silicious slag, and fluor-spar. In this case the oxygen from the iron combines with the carbon, forming carbon oxide. This oxygen may be considered a volatile or gaseous element. The phosphorus and sulphur of the ore may be considered as mineralizing or solid elements, and these are absorbed by the lime. The fluor-spar adds to the fusibility of the slag.

What I claim as new, and desire to secure by Letters Patent, is—

The herein-described metallurgical process for reducing, melting, and refining ores containing several metals—such as arsenic, antimony, bismuth, silver, chromium, cobalt, nickel, copper, tin, iron, manganese, molybdenum, gold, platinum, lead, titanium, uranium, and tungsten—in one operation, which consists in triturating the ore, mixing the same substantially in the proportions stated with the salts and alkalies—such as quicklime, slag, fluor-spar, common salt, sulphate of soda, caustic soda, black-ash, and carbonate of soda—successively subjecting the charge to increasing temperatures, thereby successively reducing and melting the various metals, and separately drawing off the reduced metals, substantially as described.

In testimony whereof I have signed my name to this specification in the presence of two subscribing witnesses.

JOSÉ BAXERES ALZUGARAY.

Witnesses:
ARISTIDES A. S. GRIMARDES,
W. MACDONALD SMITH.